TELEVISION SYNCHRONIZATION AND PHASE LOCK CIRCUIT

Filed Jan. 21, 1953 2 Sheets-Sheet 1

INVENTORS
FRANK N. GILLETTE
GEORGE W. KING
BY
H. A. Mackey
ATTORNEY

INVENTOR.
FRANK N. GILLETTE
GEORGE W. KING
BY
ATTORNEY.

United States Patent Office 2,704,307

Patented Mar. 15, 1955

2,704,307

TELEVISION SYNCHRONIZATION AND PHASE LOCK CIRCUIT

Frank N. Gillette and George W. King, Pleasantville, N. Y., assignors to General Precision Laboratory Incorporated, a corporation of New York Application January 21, 1953, Serial No. 332,318

20 Claims. (Cl. 178—69.5)

This invention relates to television synchronization and phase lock circuits as applied to television synchronzation generators, and is directed to the automatic synchronization and phasing of a synchronization signal generator with remote or external synchronization signals. The invention more particularly relates to such circuit arrangements wherein the aberrations in vertical phase shift are corrected in either direction whichever is the most expeditious, the local phase being advanced if the aberration results from a relative advance of the remote vertical phase, and the local phase being retarded if the remote signal is relatively retarded.

This invention compares and locks the local generator in horizontal synchronization signal frequency and phase with the remote signal. Since in synchronization generators the vertical synchronization signal is derived from the horizontal signal, the local vertical synchronization signal frequency is thereby automatically synchronized to that of the remote signal. The invention also, when the remote signal lags the local generator signal, derives a lag gate signal and applies it to the generator to retard the phase of its vertical synchronization signal to agree with that of the remote signal. When, however, the remote vertical signal leads the local signal in phase, the invention provides means for increasing the speed of the local signal until it is again in phase with the remote signal.

In prior circuits for synchronizing and phase locking a synchronizing signal generator by a remote signal in which only a conventional lag gate signal is provided, if the local signal lags the remote signal by a small fraction of a vertical period, phase correction is effected only by making the local signal lag still more until it has fallen behind the remote signal by a full cycle, when the two signals will come into phase with each other. During this process the vertical signals are out of phase, and the television pictures seen in receivers served by the local generator "roll-over," seeming to move as a succession of fields upward or downward, producing a kaleidoscopic effect. This effect persists for as long as a second and a half and constitutes a seriously disturbing defect. When, however, a lead signal is also provided, as it is by this invention, the maximum possible duration of "roll-over" is reduced and, as in nearly all cases of momentary phase disturbance the amount by which the signals initially go out of phase is not over 400 μs., the phase is generally corrected within the period of one field or $\frac{1}{60}$ second. A "roll-over" therefore cannot occur, and the pull-in is of such short duration as to be not visible to the eye.

As a specific example of the use of the invention, consider a local television studio receiving program material from a remote pickup point through a coaxial circuit and broadcasting such material from the transmitter associated with the local studio. The synchronization signals are inserted in such material at the remote originating pickup point and provide the timing relationships for the entire system, including all of the television receivers tuned to the transmitter and receiving its program. In this type of operation it becomes necessary at intervals of at least 30 minutes to interrupt the program for local station identification. Also it frequently is desired to insert advertising material at the local studio. In order to do this it is necessary to use local studio video equipment including a television camera and a local studio synchronization signal generator. In the absence of synchronization lock equipment a vertical roll of the picture will occur in every television receiver tuned to the transmitter every time the transmitter is switched from the remote pickup source to the local source, and every time it is switched back. This roll will persist at any receiver for a period which may be as long as several seconds, its exact length depending on the pull-in characteristic of the particular receiver. If, however, synchronization lock circuits are used, the vertical roll on switching is eliminated.

Even when the local studio synchronization is locked to that of the remote pickup point, vertical phasing can be momentarily lost by the intrusion of noise pulses. These can either advance or retard the phase and, as explained, with conventional lock circuits may lead to "roll-over" persisting for 1½ seconds. This fault is prevented by the instant invention, which effects phase lock in such manner as normally to prevent visible vertical roll at all times.

The use of the synchronization signal generator lock is not confined to the synchronizing of studios in different cities, but has been found desirable and necessary in large cities in which a signal television radio broadcasting station is served by as many as a dozen studios, located in different parts of the city, and far enough apart so that the signal transmission times to the broadcasting station vary by significant amounts due to time lag in coaxial lines or other equipment.

The purpose of this invention, then is to provide a synchronizing signal generator lock which prevents all visible "roll-over" of the television picture.

More specifically, this invention provides means for correcting the vertical phase of a local synchronizing signal generator to agree with the phase of a remotely generated signal, automatically selecting retardation or advance of the local phase to restore it to phase equality by the shortest route and in the shortest time.

A further understanding of this invention may be secured from the detailed description and associated drawings, in which.

Figure 1:
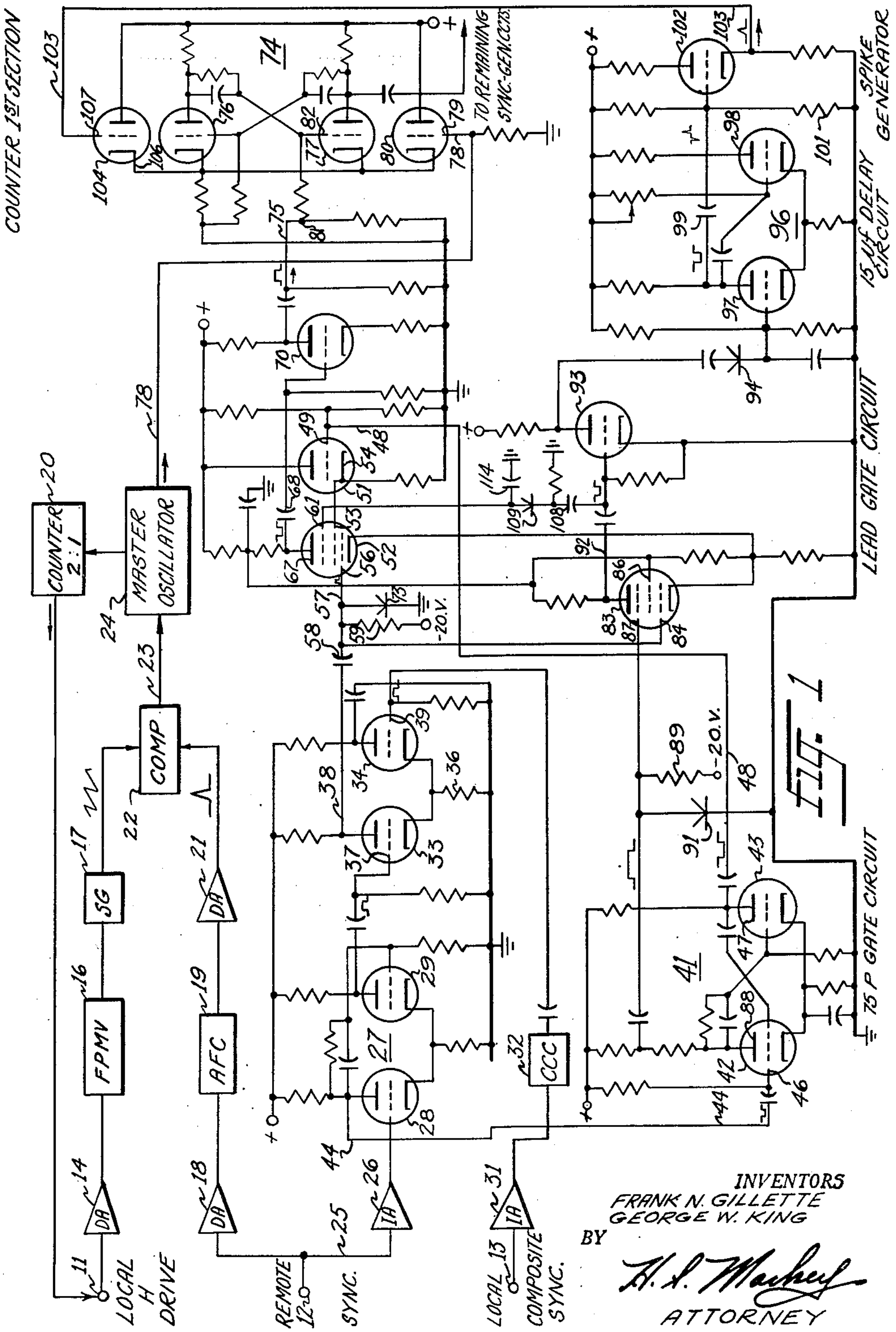
Figure 1 is a schematic diagram of an embodiment of the invention.

Referring now to Fig. 1, the input signals to the synchronizing signal lock circuit are three in number and are applied to the three input terminals 11, 12 and 13. Terminal 11 is energized from the horizontal synchronizing signal drive output of a local synchronizing signal generator, and terminal 13 is energized by the composite signal output of the same generator. Alternatively, a synchronization signal separator may be included in the instant equipment, and in such instance only a connection to the composite signal output terminal of the synchronization signal generator is required. The remote composite synchronizing signal containing both horizontal and vertical synchronizing signals, separated from the video content at a level between the synchronizing signal shoulders and the pulse tips by conventional means producing a remote composite synchronizing signal, is applied to terminal 12.

Figure 2:
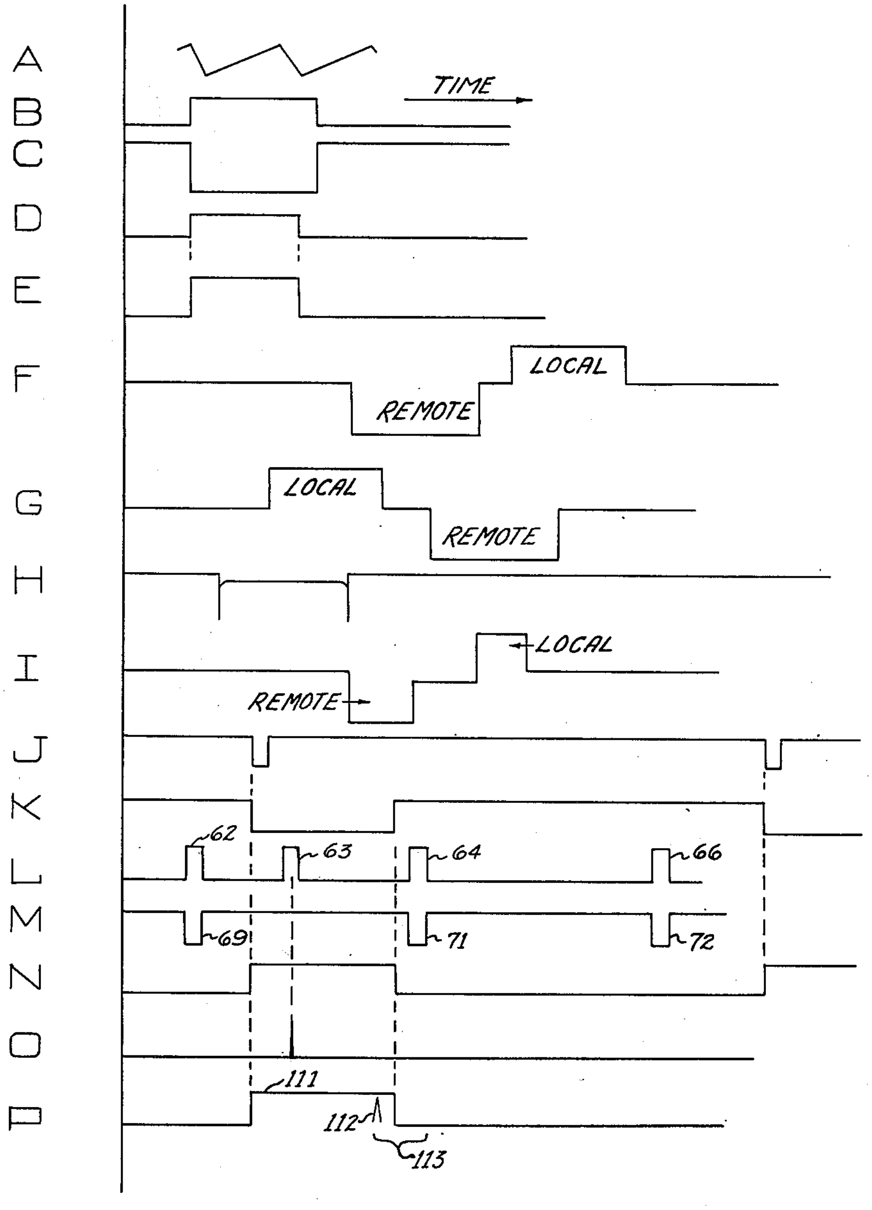
Figure 2 illustrates wave forms appearing at several points in the circuit.

The local horizontal synchronizing signals having a frequency of 15.75 kc. are applied from terminal 11 through a differentiating amplifier 14 to a front porch multivibrator 16. The output thereof is a positive rectangular pulse having a duration adjustable from 3 to 12 μs., with its front coincident in time with the front of the local horizontal drive signal. This pulse is applied to a conventional saw-tooth wave generator 17, the output of which has a steep downward slope and a less steep upward slope. Adjustment of the multivibrator 16 varies the downward slope, which is the part of the saw-tooth wave form that is utilized. This wave form is illustrated in Fig. 2 at A.

The remote composite synchronizing signal is applied from terminal 12 through a differentiating amplifier 18 to an automatic frequency control circuit 19 of conventional form. This circuit contains as oscillator of the resonant circuit type the frequency of which is controlled by a reactance tube. The oscillator output is compared in a double diode comparator with the differentiated signal derived from the remote horizontal synchronizing signal, and any error is applied in the form of a direct voltage to control the reactance tube and thereby the oscillator frequency, which is thus maintained in exact synchronism with the horizontal signal frequency contained in the remote composite synchronizing signal. The output is amplified and differentiated by the amplifier 21 to form sharp positive pulses at 15.75 kc. frequency having a selected phase relation to the fronts of the remote horizontal synchronizing pulses.

The outputs of amplifier 21 and of the saw-tooth wave generator 17 are compared in a double triode comparator 22. The output of this comparator is a direct voltage having a normal value of ground or zero potential, the divergence from zero representing the error in the phase relation of the compared signals. This direct voltage error signal is applied through a conductor 23 to the control grids of the master oscillator 24 forming a part of the synchronization signal generator. The master oscillator 24 is of the free-running multivibrator type having a normal frequency of oscillation of 31.5 kc., which is however, dependent upon the bias applied to its control grids. In operation, correcting bias applied through conductor 23 to these grids changes the frequency of the master oscillator until its output, scaled down to 15.75 kc. in a scale-of-two circuit 20 and applied at terminal 11, is alike in both frequency and phase to that of the remote signal applied at terminal 12. In this manner the synchronization signal lock circuit maintains the local synchronization signal generator 24 both synchronized and phased with the remote horizontal synchronizing signal.

The remote composite synchronization signal that is applied to terminal 12 is also conducted from that terminal through conductor 25 to an integrating amplifier 26 which is employed as a conventional means of isolating the remote vertical synchronization signal from the remote composite signal. The output is a rounded signal roughly three horizontal pulse intervals long. This output is passed through a conventional cathode-coupled clipper 27, which employs two cathode-coupled triodes 28 and 29 in an amplifying circuit employing some positive feedback. The result is a pulse about 180 μs. long having a steepened front and rear slopes, and having a flat top produced by the limiting action of the circuit.

The local composite synchronization signal is applied from terminal 13 to a circuit consisting of an integrating amplifier 31 and a cathode-coupled clipper 32. These circuits are identical to those of integrating amplifier 26 and clipper 27 except that the fixed bias on the clipper 32 is slightly less positive, with the result that the duration of the output pulse is very slightly less, being about 175 μs., for a reason that will presently appear. In form and magnitude the outputs of clippers 27 and 32 are otherwise closely alike.

The frequencies of occurrence of these output pulses of circuits 27 and 32, each nominally 60 cps., are controlled by the respective horizontal pulses, since in the respective generators the vertical signals are derived by counting down in binary counters from the master oscillator outputs having the frequency of 31.5 kc., from which the horizontal signals are also derived in separate binary counters. Therefore, the vertical signals at the outputs of circuits 27 and 32 are in synchronism when the horizontal pulses are in synchronism. The vertical signals may however, be out of phase, or after being in phase may shift in relative phase due to a number of reasons. For example, extraneous transient electrical pulses may enter the circuit bringing the remote signals to the studio, or transients may be induced in local circuits due to nearby electrical equipment. In any case these transients may either introduce spurious horizontal pulse signals into the circuit or may blot out one or more horizontal pulses from either the remote signal input or the local signal input. These disturbances, collectively classed as "noise," are responsible for the possibility of the vertical signals going out of phase from time to time and lead to the requirement for the improved generator lock of this invention.

The outputs of the cathode-coupled clippers 27 and 32 are applied to a subtraction amplifier comprising triodes 33 and 34 having a common cathode resistor 36. This common form of differential amplifier produces an output pulse proportional to the difference between the two input pulses. The amplifier is here employed to compare the two input pulses in time and to produce an output pulse indicative of the phase lead or lag of the local input pulse relative to the remote input pulse.

The remote pulse, approximately rectangular and 180 μs. in duration, is positive as applied to the control grid 37 of triode 33 as shown at B, Fig. 2, and results, if no cathode pulse be applied, in a like amplified inverted or negative pulse at the output plate conductor 38, as shown at C, Fig. 2. Likewise the local pulse, 175 μs. in duration, is positive and is applied to the control grid 39 of triode 34, as shown at D, Fig. 2. This results, in the absence of the other signal, in an output pulse E, Fig. 2, at the plate conductor 38. This pulse is opposite in polarity to the pulse C and of lower peak to peak potential because it is cathode coupled through triode 34. When the local signal lags the remote signal by more than its time length, the output conductor 38 carries both signals separately, as illustrated at F, Fig. 2, with the positive signal lagging; and when the local signal leads the remote signal by more than its length the output 38 again contains both signals, but displaced oppositely, as illustrated at G, Fig. 2. When both inputs occur at the same time the output due to the local pulse is completely enclosed in and neutralized by the other output, as shown at H, and when they occur at nearly the same time they partly neutralize or cancel each other, as shown at I.

In order to distinguish the local lagging case F from the local leading case G it is necessary to generate a gate pulse that occupies in each vertical pulse period of 1/60 second, the period of time immediately following the leading edge of the remote vertical pulse. It is convenient to measure time intervals within the vertical pulse period of 16,666 μs. in terms of the basic 31.5 kc. synchronization pulse generator frequency, which is the frequency of the equalizing pulses and those occurring within the vertical block. In terms of these, the gate pulse is made 75 equalizing pulses long, or 1/7 of a vertical pulse period, that is, 2381 μs.

This pulse is generated by a monostable multivibrator 41 comprising triodes 42 and 43 with triode 42 made normally conductive. The remote clipped vertical negative pulse J, Fig. 2, is applied through conductor 44 to the control grid 46, so that its leading edge triggers the multivibrator to produce a negative rectangular pulse, 75 equalizing pulse periods long, at the plate 47. This pulse is shown at K, Fig. 2, and is applied through conductor 48 to the control grid 49 of a cathode follower 51.

The lag gate generator comprises a pentode 52 any of the three grids of which can be used to control plate current. All three are in fact separately used to control the tube in such fashion that when any one of them is negative the tube current is cut off. The second grid 53 of tube 52 is connected to the cathode 54 of the cathode follower 51, so that the tube 52 is cut off during the duration of the negative 75-pulse gate applied through the cathode follower 51. The first grid 56 of tube 52 is connected through conductor 57 and condenser 58 to the output conductor 38 of the difference amplifier, so that it may receive pulses having one of the forms shown, for example, at F, G, H and I of Fig. 2. This grid 56 is highly negatively biased by reason of its connection through resistor 59 to a −20 volt source, so that in the absence of positive pulses this bias maintains tube 52 nonconductive. When, however, the pulses applied to the grid 56 through conductor 57 are of any of the forms shown at F, G and I, Fig. 2, they either contain positive portions which lag the negative portions as in F and I, or contain positive portions which lead the negative portions as in G. When the positive portions lag as in F and I, they have no effect on the tube 52 because it is prevented from operation by the presence of the 75-pulse gate on its second grid, but when they lead, as in G, the 75-pulse gate is not present and, assuming the third grid 61 is not negative, the tube 52 is made conductive for the duration of the positive pulse, which may be for a maximum time equal to six equalizing pulse intervals or for any time less than that.

This action is illustrated more explicitly in Fig. 2 at L, which represents a series of positive pulses, each six equalizing pulse periods long, applied within one field period to the grid 56, Fig. 1, at 62, 63, 64, and 66, Fig. 2, although it will be understood that in operation only one such pulse can occur in each field period. Graph M represents the resulting negative voltage pulses appearing at the plate 67 of tube 52 and on its plate conductor 68. Plate pulses 69, 71 and 72 appear corresponding to grid pulses 62, 64 and 66 respectively, but no pulse corresponding to 63 appears at the plate because at that time the tube is held nonconducting by its second grid.

The crystal diode 73 limits grid input pulses to a 20-volt rise by holding their peaks to a maximum of ground potential.

Output pulses at conductor 68 are amplified and inverted in amplifier 70 to form positive output pulses at output conductor 75 suitable for application to the synchronization signal generator as a lag gate.

A conventional synchronization signal generator usually includes a counter for counting down by scale-of-two electronic stages from 31.5 kc. to 60 cps. A representative first counter stage is schematically shown at 74, Fig. 1, comprising bistable multivibrator tubes 76 and 77. It is regularly triggered at the 31.5 kc. rate by positive pulses applied from the master oscillator of the generator through conductor 78. It is to be realized, however, that although the first counter stage 74 and the master oscillator are shown separately for clarity, they are both component parts of the synchronization signal generator. The conductor 78 is connected to the grid 79 of a trigger triode 80 so that the application of a series of positive pulses at the 31.5 kc. rate from generator 24 to the trigger tube 80 causes the multivibrator stage to assume its alternate states of operation. However, application of a positive pulse, six equalizing pulse periods long, through conductor 75 to the junction 81 of the grid bias resistors of triode 77 causes grid 82 to assume such high positive bias as to cause or hold tube 77 in its conductive state during that entire time, so that the six 31.5 kc. input pulses occurring during that time cannot trigger the multivibrator. The 60 cps. output pulse of the chain is therefore retarded by about 180 μs. in this and each such field period. This in turn retards the local vertical synchronization signal applied to input terminal 13. Its effect on the difference signal is that, in graph G, the positive pulse is moved toward the right relative to the negative pulse until the condition shown in H results when, since there is no longer any positive pulse at 38, there will be no signal applied from the difference amplifier output 57 to the lag gate generator and there will be no lag gate generated. This action is complete because the local pulse is about 5 μs. shorter in duration than the remote pulse, so that the local pulse is completely contained in and cancelled by the remote pulse. During the last part of this action, when the lag gate such as 62 in L, Fig. 2, is six or less pulses in length, the local counter 74 is retarded by exactly the correct number of pulses to cause elimination of lag gate for the next vertical block. This greatly improves stability of the circuit by eliminating overshoot.

The lead gate generator comprises a pentode 83 similar to the lag gate pentode. Its first grid 84 is connected to conductor 57 so that the positive difference signals are also applied to it. Its second grid 86 is connected to a source of constant positive potential and does not prevent plate current from flowing at any time. Its third grid 87 is connected to the plate 88 of the 75-pulse multivibrator gate generator 41, so that during the 75-pulse period this grid 87 is positive. At all other times it is held at −20 volts by being connected through resistor 89 to a source of negative bias. The crystal diode 91 prevents the grid 87 from rising above ground potential.

Graph N represents the positive 75-pulse gate applied to grid 87. When, therefore, pulses such as 62, 63, 64 or 66, graph L, are applied to grid 84, those lying outside the time of the 75-pulse gate have no effect because the tube is held nonconductive by grid 87. Other pulses such as pulse 63, however, do render the tube conductive, and result in a negative output pulse at the plate conductor 92, the leading edge of which occurs at the same time as the leading edge of the positive portion of the pulse on conductor 57 and also the leading edge of the vertical local pulse applied to input terminal 13.

The negative pulse on conductor 92 is amplified and inverted in amplifier 93 and the resulting positive pulse is passed through the crystal diode 94 to insure the absence of negative spikes. It is then applied to a 15 μs. delay circuit consisting of a monostable multivibrator 96 comprising triodes 97 and 98. The output is a 15 μs. negative rectangular pulse. The output is differentiated in the circuit consisting of condenser 99 and resistor 101 and is then applied to cathode follower 102. In this tube the negative spike is cut off and the positive spike is transmitted to the output conductor 103. It will be noted that this spike is 15 μs., or one half equalizing pulse interval, later than the front of the local generator vertical pulse.

The sharp pulse or spike thus generated at conductor 103 is so applied to the counting circuit 74 so as to advance its count by one pulse in every field period. A trigger triode 104 is connected through its cathode 106 with the counting circuit cathodes, and its grid 107 is connected to conductor 103. The positive spikes thereon then trigger the counting section just as the input pulses at conductor 78 do. Since the spike applied at conductor 103 occurs 15 μs. behind the front of the vertical pulse, it occurs approximately half-way between two of the 31.5 kc. input pulses applied at 78, hence does not interfere with them. Therefore, when this spike occurs, the 525 pulses of a field period occur in the time in which only 524 pulses normally would occur, causing the vertical pulse phasing controlled by the counter to be advanced by $\frac{1}{525}$ cycle in that field period. That is, its phase is advanced 0.7° in that $\frac{1}{60}$ second period.

This is graphically shown in Fig. 2 at O, representing a positive spike derived from pulse 63 during the 75-pulse period N, and applied to grid 107. Since its effect is to advance the local vertical pulse it moves toward the left until coincident with the left edge of the 75-pulse gate N, when it disappears.

To recapitulate, any positive difference signal such as any one of those illustrated in L, Fig. 2, if it occurs outside the 75-pulse period, causes the local vertical signal to lag and move to the right at the rate of six equalizing pulses per field until its left edge is coincident with the left edge of a 75-pulse period. If the difference signal occurs inside the 75-pulse period it causes the local vertical signal to advance and the pulse moves to the left at the rate of one equalizing pulse per field until its left edge is coincident with the left edge of the 75-pulse period.

It is to be noted that lag is at a rate six times that of lead, but the lag pulse also has six times the maximum possible distance to travel that the lead pulse has, therefore, the maximum possible correction times are equal in the lagging and leading cases.

The right end of the 75-pulse gate forms a false or ambiguous locking point, for if the 6-pulse local positive rectangular signal as shown in F or G, Figure 2, should be applied to the lag and lead gate circuits so as to span the right or lagging end of the 75-pulse interval, both the lag gate circuit and the lead gate circuit would generate gate pulses. The lead gate output would cause a leading adjustment of the phase by one equalizing pulse interval in each vertical interval, and if the amount of overlap of the 6-pulse and 75-pulse signals were such as to cause the lag gate output to make a lagging adjustment of one equalizing pulse interval also, these leading and lagging adjustments would be equal in amount and would cancel each other, so that the signal would be locked at this ambiguous point.

To eliminate possibility of the circuit locking in this undesired manner, the lead gate circuit is made to disable the lag gate circuit as follows: The lead gate plate conductor 92 is connected through condenser 108 and crystal diode 109 to the third grid 61 of the lag gate pentode 52. When, therefore, a negative output pulse appears on the plate conductor 92, it applies a signal that renders the third grid 61 of tube 52 negative and prevents generation of the lag gate for a period of several hundred μs, following the front of the local vertical pulse. This is graphically shown but not to scale at P, Figure 2, in which 111 represents the 75-pulse gate and 112 represents the lead gate spike at conductor 103, which it is assumed has appeared very near the right edge of the 75-pulse gate. The pulse through diode 109 disables the lag gate for a period schematically represented by the bracket 113, Fig. 2, thus preventing the generation of the lag gate which would otherwise be generated at tube 52 by the trailing part of the difference signal. The pulse through diode 109 also charges condenser 114, so that the disabling effect on tube 52 persists for about 12 equalizing pulse periods. After the spike has moved toward the left by a distance equivalent to this time the disabling effect disappears.

What is claimed is:

1. A synchronizing and phase locking circuit comprising, a local synchronizing signal generator including a counter chain, said generator generating local vertical signals, a source of external vertical synchronizing signals, means for initiating by said generator signal a first signal in synchronizm with said local vertical signal, means for initiating a second signal by said external vertical signal in synchronizm therewith, means operative by the time precedence of said first signal relative to said second signal for inhibiting operation of said counter chain for a selected time, and means operative by time precedence of said second signal relative to said first signal for operating said counter chain in excess of its normal operation.

2. A synchronizing and phase lock circuit comprising, a local synchronizing signal generator including counter circuits actuated by a master oscillator producing local synchronizing signals, a source of external synchronizing signals, means for deriving a first signal whose time of occurrence is dependent on the time of occurrence of a vertical signal derived from said local synchronizing signal generator, means for deriving a second signal whose time of occurrence is dependent on the time of occurrence of a vertical signal derived from said source of external synchronizing signals, means operative by the time precedence of said first signal relative to said second signal for inhibiting the operation of said counter circuits for a selected time interval, and means operative by the time precedence of said second signal relative to said first signal for operating said counter circuits in excess of their normal operation.

3. A synchronizing and phase lock circuit comprising, a local synchronizing signal generator including counter circuits actuated by a master oscillator producing local synchronizing signals, a source of external synchronizing signals, means for deriving a first pulse signal whose time of occurrence is dependent on the time of occurrence of a vertical synchronizing signal derived from said local synchronizing signal generator, means for deriving a second pulse signal whose time of occurrence is dependent on the time of occurrence of a vertical synchronizing signal derived from said source of external synchronizing signals, means for combining said first and second signals in opposite sense to form a combined wave signal, means operative by said combined wave signal for inhibiting the operation of said counter circuits when said first signal precedes said second signal in said combined wave, and means operative by said combined wave signal for operating said counter circuits in excess of their normal operation when said second signal precedes said first signal in said combined wave.

4. A synchronizing and phase locking circuit comprising, a local synchronizing signal generator including counter circuits actuated by a master oscillator producing local synchronizing signals, a source of external synchronizing signals, means for deriving a first pulse signal whose time of occurrence is dependent on the time of occurrence of a vertical synchronizing signal derived from said local synchronizing signal, means for deriving a second pulse signal whose time of occurrence is dependent on the time of occurrence of a vertical synchronizing signal derived from said source of external synchronizing signals, means for deriving a third pulse signal whose time of occurrence is dependent on the time of occurrence of a horizontal synchronizing signal derived from said local synchronizing signal, means for deriving a fourth pulse signal whose time of occurrence is dependent on the time of occurrence of a horizontal synchronizing signal derived from said source of external synchronizing signals, means for comparing said third and fourth pulse signals to form a horizontal pulse phase correction signal, means for applying said horizontal pulse phase correction signal to said local synchronizing signal generator to maintain it in synchronizm and phase with said external synchronizing signals, means for combining said first and second pulse signals in opposite sense to form a combined wave signal, lag means operative by said combined wave signal for inhibiting the operation of said counter circuits when said first signal precedes said second signal in said combined wave signal, and lead means operative by said combined wave signal for operating said counter circuits at a faster rate than their normal operation when said second signal precedes said first signal in said combined wave.

5. A synchronizing and phase locking circuit in accordance with claim 4 in which the time of inhibition of the operation of said counter circuits by said lag means has a maximum duration in any one field period equal to the duration of six equalizing pulse periods, and in which the number of operations of said counter circuits by said lead means is confined to a maximum of once per field.

6. A synchronizing and phase locking circuit comprising, a local synchronizing signal generator including counter circuits actuated by a master oscillator producing local synchronizing signals, a source of external synchronizing signals, means for initiating a first pulse signal of preselected duration at the time of occurrence of a vertical synchronizing signal derived from said source of external synchronizing signals, means for initiating a second pulse signal of preselected duration at the time of occurrence of a vertical synchronizing signal derived from said local generator, means for combining said first and second pulse signals to form a combined wave signal, means for initiating a gate signal at the time of occurrence of the vertical synchronizing signal derived from said source of external synchronizing signals, and means jointly controlled by said gate signal and said combined wave signal, for inhibiting the operation of said counter circuits when said second pulse signal precedes said first pulse signal, and for operating said counter circuits in excess of their normal operation when said first pulse signal precedes said second pulse signal.

7. A synchronizing and phase locking circuit in accordance with claim 6 in which the ratio of the duration of said gate signal to the duration of one television field minus said gate signal equals the ratio of the duration of one television equalizing pulse to the duration of one vertical synchronizing signal pulse.

8. A synchronizing and phase locking circuit in accordance with claim 6 in which the duration of said gate signal is equal to the duration of 75 television equalizing pulses.

9. A synchronizing and phase locking circuit in accordance with claim 6 in which the duration of said gate signal is equal to one seventh of the duration of one field.

10. A synchronizing and phase locking circuit comprising, a local synchronizing signal generator including counter circuits actuated by a master oscillator producing local synchronizing signals, a source of external synchronizing signals, means for initiating a first pulse signal of preselected duration at the time of occurrence of a vertical synchronizing signal derived from said source of external synchronizing signals, means for initiating a second pulse signal of preselected duration at the time of occurrence of a vertical synchronizing signal derived from said local generator, means for combining said first and second pulse signals to form a combined wave signal, means for initiating a first gate signal at the time of occurrence of the vertical synchronizing signal derived from said source of external synchronizing signals, lag means gated by said first gate signal and having said combined wave signal impressed thereon for inhibiting the operation of said counter circuits when said second pulse signal precedes said first pulse signal, means for initiating a second gate signal having phase and duration equal to those of said first gate signal, and lead means gated by said second gate signal and having said combined wave signal impressed thereon to produce an output signal when said first signal precedes said second signal in said combined wave signal, for operating said counter circuits in excess of their normal operation.

11. A synchronizing and phase locking circuit in accordance with claim 10 in which the duration of said first gating signal bears the same ratio to the remainder of one field period as one equalizing pulse period bears to one vertical synchronizing pulse period.

12. A synchronizing and phase locking circuit in accordance with claim 10 in which the duration of said first gating signal bears the same ratio to one field period as one equalizing pulse period bears to the sum of one vertical synchronizing pulse period and one equalizing pulse period.

13. A synchronizing and phase locking circuit in accordance with claim 10 in which the duration of said first gating signal equals the duration of 75 equalizing pulse periods.

14. A synchronizing and phase locking circuit in accordance with claim 10 in which said lag means inhibits said counter circuits not more than once per field, the duration of each inhibition having a range of duration of one to six equalizing periods.

15. A synchronizing and phase locking circuit in accordance with claim 10 in which said lead means operates said counter circuits in excess of their normal operation not more than once in each field period.

16. A synchronizing and phase locking circuit in accordance with claim 10 including means actuated by said lead means output signal for disabling said lag means.

17. A synchronizing and phase lock circuit comprising, a local synchronizing signal generator including counter circuits actuated by a master oscillator producing local synchronizing signals, a source of external synchronizing signals, means for initiating a first pulse signal at the time of occurrence of a vertical synchronizing signal derived from said source of external synchronizing signals, said first pulse signal having a preselected duration, means for initiating a second pulse signal at the time of occurrence of a vertical synchronizing signal derived from said local synchronizing generator, said second pulse signal having a preselected duration slightly less than that of said first pulse signal, differential amplifier means combining said first and second pulse signals in opposed relation producing therefrom a combined pulse wave of opposed alternations, the relative time displacements of which correspond to the relative times of occurrence of said first and second pulse signals, means for initiating a first gating signal at the time of occurrence of the vertical synchronizing signal derived from said source of external synchronizing signals, said first gating signal having a time duration exceeding the combined duration times of said first and second pulse signals but less than the period of one television field, a first coincidence circuit having said combined pulse wave impressed thereon, said first coincidence circuit including means operated by said first gating signal for preventing signal transfer therethrough during the time of occurrence of said first gating signal, means operative by the output signal of said coincidence circuit for inhibiting the operation of said counter circuits, means for initiating a second gating signal in timed relation to said first gating signal, a second coincidence circuit having said combined pulse wave impressed thereon, said second coincidence circuit including means transferring signals therethrough only during the time of occurrence of said second gating signal, means operative by the output signal of said second coincidence circuit for producing a sharp pulse signal a selected time subsequent to the initiation of said output signal, and means operative by said sharp pulse signal for actuating said counter circuits.

18. A synchronizing and phase locking circuit in accordance with claim 17 including means actuated by said second coincidence circuit for disabling said first coincidence circuit.

19. A synchronizing and phase locking circuit comprising, a local synchronizing signal generator including counter circuits actuated by a master oscillator producing local horizontal and vertical synchronizing signals, a source of external horizontal and vertical synchronizing signals, means for comparing said local and external horizontal synchronizing signals to control said master oscillator, means for initiating a first pulse signal having a preselected duration from said source of external vertical synchronizing signal and of like phase, means for initiating a second pulse signal having a duration slightly less than said preselected duration from said local generator of vertical synchronizing signals and of like phase, differential amplifier means combining said first and second pulse signals in opposite polarities producing therefrom a combined pulse wave having positive and negative amplitudes the relative time occurrences of which correspond to the relative times of occurrence of said first and second signals, means for initiating a first gating signal from said source of external vertical synchronizing signals and of like phase of pulse front, said first gating signal having a time duration ratio relative to one field period equal to the ratio of one equalizing pulse period to the sum of one equalizing pulse period and one vertical synchronizing pulse period, a first coincidence circuit having said combined pulse wave impressed thereon, said first coincidence circuit including means operated by said first gating signal for preventing signal transfer therethrough for the duration thereof, means operative by the output signal of said coincidence circuit for inhibiting the operation of said counter circuits for periods not greater than one vertical synchronizing pulse period and no more than once in each field period, means for initiating a second gating signal equal in length but opposite in polarity to said first gating signal from said source of external vertical synchronizing signals and of like time of occurrence of pulse front, a second coincidence circuit having said combined pulse wave impressed thereon, said second coincidence circuit including means transferring signals therethrough only during the period of said second gating signal, means operative by the output signal of said second coincidence circuit for disabling said first coincidence circuit, means operative by the output signal of said second coincidence circuit for producing a sharp pulse signal at a time one-half equalizing pulse period subsequent to the initiation of said output signal, and means operative by said sharp pulse signal for actuating said counter circuits.

20. A synchronizing and phase locking circuit in accordance with claim 19 in which the length or duration of said first signal is one-seventh of a field period, in which the sharp pulse signal produced by said means operative by the output signal of said second coincidence circuit follows the initiation of said output signal by 15 $\mu s$., and in which the preselected duration of said first pulse signal is 180 $\mu s$.

References Cited in the file of this patent

UNITED STATES PATENTS

| | | |
|---|---|---|
| 2,556,933 | Mulligan | June 12, 1951 |
| 2,570,775 | De Baun | Oct. 9, 1951 |